Patented Mar. 25, 1947

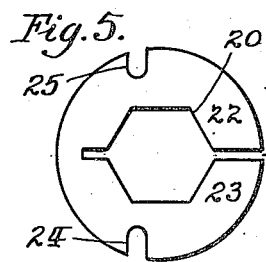
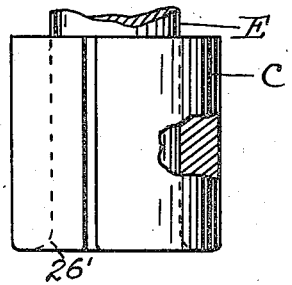
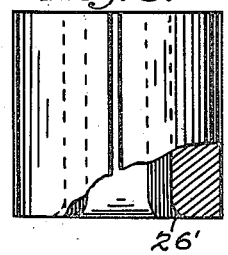
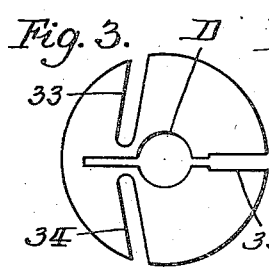
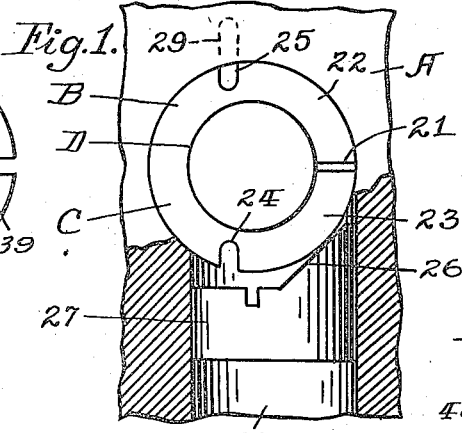
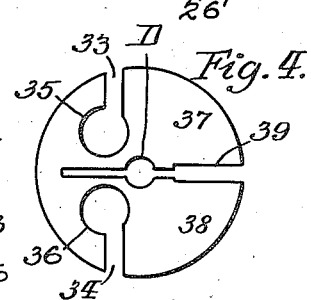
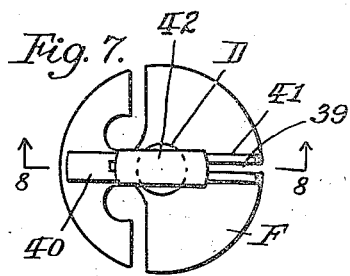
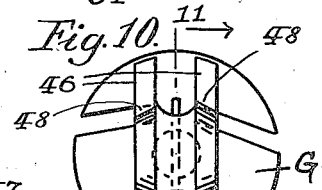
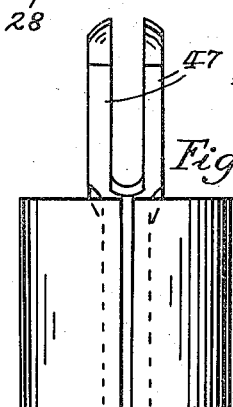
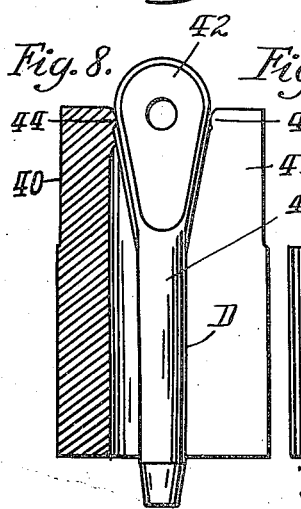
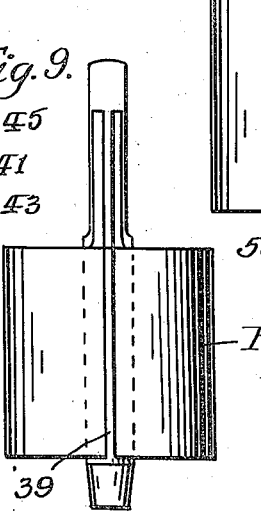

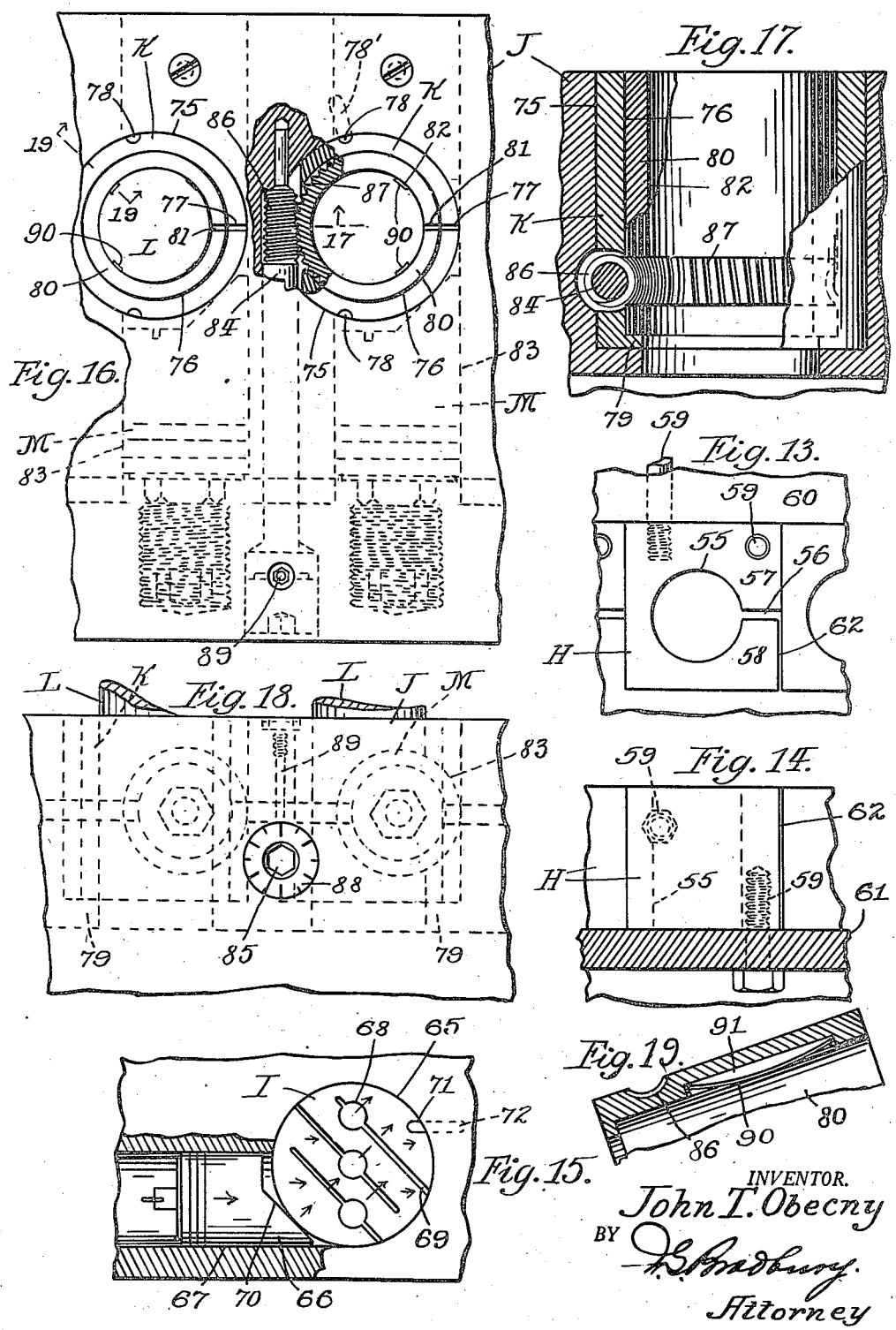

2,417,836

UNITED STATES PATENT OFFICE 2,417,836

COLLET

John T. Obecny, Los Angeles, Calif.

Application April 24, 1943, Serial No. 484,413

1 Claim. (Cl. 279—54)

This invention relates to improvements in collets for use particularly although not exclusively in work holders such as are used in machines for milling, cutting, grinding and other work, and partly as set forth in my companion application, Serial Number 405,319, filed August 4, 1941 (Patent No. 2,339,800), of which the present application is a continuation in part.

The primary object of this invention is to provide a collet which will effectively grip and hold a work piece with sufficient firmness well beyond critical stress, whereby the work piece can be machined or worked without deforming or distorting, irrespective of the character of its material. Another object of the invention is to provide a collet which will automatically release the work piece when operating force for contracting the collet ceases. Another object is to provide a collet in which an elastic gripping force is applied evenly so as to hold the work piece firmly without slipping or loosening. Among still further objects is to provide a collet which is simple and inexpensive in construction and which is adapted for use in a work holder such as of the type disclosed in my companion application for patent above identified and which lends itself for efficient and effective use for gang milling, fabricating and any other machine or working operation desired.

These and other objects and advantages, together with features of construction will appear from the following specification, of which the drawings form a part.

In the drawings, Fig. 1 is a plan, partly broken away and in section of a detail portion of a work holder showing my improved collet in place; Fig. 2 is a side elevation of the collet, when removed from the holder which is shown in Fig. 1; Figs. 3 and 4 are plans of slightly modified forms of the collet; Fig. 5 is a plan of the collet shown in Fig. 1, when constructed with a polygonal socket or bore; Fig. 6 is a side elevation, partly broken away and in section of the structure shown in Fig. 5; Fig. 7 is a plan of a modified form of my improved collet for holding a particular type of work piece for straddle milling; Fig. 8 is a vertical section taken on the line 8—8 of Fig. 7; Fig. 9 is a side elevation of the structure shown in Figs. 7 and 8; Fig. 10 is a plan of another modified form of my improved collet, for holding a particular type of work piece for straddle milling and slotting; Fig. 11 is a section taken on the line 11—11 of Fig. 10; Fig. 12 is a side elevation of the structure shown in Figs. 10 and 11; Fig. 13 is a plan of a detail portion of a work holder, showing a collet of another modified form held therein; Fig. 14 is a front elevation partly in section of the structure shown in Fig. 13; Fig. 15 is a plan of a detail illustrating a work holder equipped with another alternative construction of collet; Fig. 16 is a plan of a detail illustrating a work holder provided with another modified form of my improved collet, when held in a chuck opening and provided with means by which the work piece can be accurately indexed to permit machining its surface with polygonal sides; Fig. 17 is a section of a detail taken approximately on the line indicated by 17 in Fig. 16; Fig. 18 is a front elevation of the structure shown in Fig. 16; and Fig. 19 is a section of a detail taken on line 19—19 across the collet shown in Fig. 16.

Referring to Fig. 1, there is illustrated a detail portion of a work holder A, such as is employed for holding a plurality of work pieces in suitable out-standing position for machining or working in a milling machine, grinding machine, shaper, planer or any other type of machine or work unit. The work holder has socket openings resembling chucks such as B, of suitable cross sectional shape and dimension to form a seat for receiving and sustaining my improved collet such as C. As illustrated the chuck seat is of cylindrical shape and the collet is of corresponding shape and of normal diameter corresponding substantially with that of the bore of the seat, whereby the collet can when desired be freely inserted in or removed from its seat in the holder. The collet is composed of resilient metal, plastic or any other suitable material. When desired tempered metal may be employed. The body of the collet is provided with a substantially axially disposed work piece receiving bore D, the wall of which is cylindrical but may be polygonal or other suitable shape to grip and restrain the work piece from rotating in the collet. One polygonal form of bore 20 is shown in Fig. 5, wherein it is hexagonal. The wall of the collet is of any desired thickness to provide a substantial work piece holding socket of suitable cross sectional dimension and shape. The body of the collet has a longitudinal slit 21 which extends transversely across its wall either diametrally as shown or at any angle desired. This slit provides a slight gap between a pair of resilient arcuate arms 22 and 23, which permit the collet to contract and engage a work piece E (see Fig. 2). The upper inner corner of the bore terminates at right angle while the opposite end terminates in an inner curved corner 26' to conform with different work pieces when the collet is reversed in a chuck.

The resilient arms 22 and 23 are weakened by a pair of oppositely disposed inwardly directed slots 24 and 25, traversing the outer wall of the collet longitudinally. These slots form weakening cavities and are preferably spaced a sufficient distance from the slit 21 to improve the resiliency of the arms 22 and 23. As shown in Fig. 1, the collet is placed in the chuck B of the holder as clearly set forth in my companion application above identified, with the outer curved surface of one of its arms 23 facing forwardly to be engaged by the inner end tapering surface 26 of the hydraulically driven compression plunger 27. In this position the direction of the slit is transverse or normal to the line of travel of the plunger 27. The plunger is reciprocable in the bore 28 of a compression unit, the line of travel of said plunger being substantially transverse to the axis of the collet and its seat. To hold the collet rigidly from rotating during the compression stroke of the plunger, the collet is engaged by a key or dowel pin 29, which is held rigidly seated in the body of the holder and engages the collet in one of its slots such as 25. Hence, the slots 24 and 25 not only weaken the wall of the collet to improve resiliency of its gripping arms but also serve to cooperate in holding the collet from rotating in its seat B and to position the collet correctly in the holder.

For use in holding a work piece having a circular body or shank of comparatively small size in cross section, a socket D of corresponding small size as shown in Figs. 3 and 4 is provided in the collet and the weakening slots or cavities 33 and 34 are extended to greater depth and at a rearward converging angle as shown in Fig. 3, or they are connected with open enlarged spaces 35 and 36 as shown in Fig. 4 to provide greater resiliency of the compression arms 37 and 38. For the same purpose the slit 39 is carried to greater depth diametrally across the body and its socket D to further weaken the wall of the collet and provide increased resiliency of the compression arm members.

In operation the arm 22 is held rigidly by the wall of chuck D and the key 29. During the forward movement of the plunger the cooperating surfaces of the plunger and the wall of arm 23 cause the collet to be compressed by a wrapping action around the shank portion of the work piece held in the collet, the weakening slots above described and the slit shown in Figs. 3 and 4 equalizing the wrapping tendency and improving the resiliency of the structure. The work piece is therefore effectively engaged and held rigidly by the collet without slipping or loosening while being machined or worked.

In Figs. 7 to 9 inclusive, the collet body F of the general type shown in Fig. 4 is provided with integral upwardly extending work piece supporting arms 40 and 41 for rigidly holding the head 42 of a particular type of work piece for straddle milling. In this construction the body of the work piece is clamped in the socket D in the body of the collet as in the construction above described. A pair of inwardly facing contact points 44 and 45 on the supporting arm members 40 and 41 support the head piece while it is being slotted and machined. The slit or gap 39 in the body for permitting contraction of the collet is extended upwardly through the supporting arms 40 and 41. The construction thus set forth is adapted for what is commonly termed straddle milling, grinding or any other machining operation or working.

By slight modification of the construction shown in Figs. 7 to 9 inclusive, my improved collet is adapted for straddle milling and slotting operation on the particular type of work shown in Figs. 10 to 12 inclusive. In this modification the body G of the collet is substantially of the type shown in Fig. 3 and the integral longitudinally extending work supporting arms are spaced apart to provide a suitable slotting space. In this construction, contact points 48 on the several arm members are provided for steadying and supporting the head 49, while the shank 50 is clamped in the collet and the head of the work piece is being straddle milled and slotted.

In Figs. 13 and 14 my improved collet is of that type disclosed in my companion application Serial No. 354,597, filed August 28, 1940 (Patent No. 2,339,799), of which this application is a continuation in part. In this type the collet body H is of rectangular shape and contains a work holding socket 55. The body is slit longitudinally at 56 to provide a gap between the resilient arms 57 and 58, whereby the collet can be compressed to engage and hold a work piece firmly in its socket. One side of the collet including the arm member 57 is secured rigidly by fastening means such as bolts 59 on the supporting walls 60 and 61 in the body. In this manner a series of the collets can be held by the body. The collet is adapted to be compressed by the application of a plunger or other compression means against the forward face of the collet including the resilient arm 58. In this manner the collet arm 58 is contracted by a wrapping movement to securely engage a work piece in its bore. The end 62 of the arm 58 is shortened to permit free compression space when a number of collets are assembled in close position in the body.

In Fig. 15, the resilient cylindrical collet body I is shown seated in the corresponding chuck 65 of a work holder and the hydraulically actuated reciprocable plunger 66 disposed in the bore 67, the line of travel against the side wall of the collet being substantially transverse to the axis of the collet. A plurality of sockets 68 are provided in the collet to grip and hold a plurality of work pieces to be machined or worked simultaneously. A series of parallel slits 69 in staggered arrangement, from opposite sides of the collet body are provided, there being a single slit intersecting each socket and all of the slits being arranged normal to the beveled face 70 of the plunger 66, so that when the plunger advances the collet is compressed to grip and hold all of the work pieces securely in the collet. The collet body also has a longitudinal weakening channel 71 in its outer surface to provide engagement with the key 72 to prevent rotation and to improve flexibility of the collet.

In Figs. 16 to 18 inclusive, my improved collet is shown associated with indexing means by which the work piece which is held by the collet can be rotated to permit machining or working a number of surfaces while being held in selected rotative positions. For instance, in milling, grinding or other working, the work piece can be rotated by the collet and adjusted with accuracy to produce a series of finely proportioned and truly finished surfaces. The supporting body J has a series of chucks, such as 75, in which resilient contractible collet bodies such as K are seated. Each collet body resembles the general type above described having a bore 76, being slit at 77 to permit compression, and having longitudinal weakening slots 78 to increase resiliency. The collet body is prevented from rotating in its chuck 75, by the key 78', which is seated in the body J and engages the collet body in one of the slots 78. Rotatively seated in the bore of the collet body and on the annular shoulder 79 (see Fig. 17) in the collet body is a collet sleeve 80, which is slit longitudinally at 81 to provide a transverse gap corresponding with the slit 77. The collet sleeve has a socket 82 in which the work piece such as L is engaged by simultaneously compressing both the collet body and said sleeve. The compression of these members may be by hydraulically actuated plungers M working simultaneously in bores 83 in the body J, in the manner described in connection with Fig. 1, and particularly in my companion application, Serial No. 483,501, filed April 17, 1943, it being understood that a plurality of hydraulically actuated compression units are provided for gang operation of a number of the work holding collet elements, when applied to any of the types of my improved collet above set forth.

In released condition, the collet sleeve 80 can be rotated in a plane transverse to the axis of the collet body by a screw threaded shaft 84 which is suitably journaled in the body J and extends forwardly through the body and can be revolved by the application of a socket wrench to the polygonal sided socket 85 (see Fig. 18). The screw thread 86 of the shaft, meshes with a corresponding annular set of threads 87 of a worm gear, in the annular outer surface of the sleeve so that by revolving the shaft, the sleeve in which the work piece is seated can be rotated to adjust and graduate the position of the work piece. When the collet sleeve is regulated as desired in any of its annular positions, the compression member M is applied by the application of fluid medium under compression, thus resulting in the simultaneous compression of both the collet body and its sleeve to engage and hold the work piece therein, rigidly in selected operative position. The indexing scale 88 (see Fig. 18), which is associated with the shaft 84 enables the operator to determine by micrometer adjustment, the angular positions for machining the work piece with high precision accuracy. The shaft is shown keyed in place in the body J by the key bolt 89.

When the compression unit is released into normal inoperative position, the collet sleeve 80 expands and assumes normally released position. Longitudinally disposed spring friction arms 90 (see Fig. 19), seated in recess grooves 91 and engaging the outer side wall of the collet sleeve, serve normally to frictionally engage and hold the workpiece in the collet sleeve against unintentional rotation or removal from the sleeve when the sleeve is at rest or is being rotated by the hand operated adjusting means. It will be understood that the collet sleeve 80 may be constructed substantially similar to any of the other collet structures above described, excepting that gear driven or other equivalent means, such as described above, is applied thereto.

In accordance with the patent statutes, I have described the principles of operation of my invention, together with the construction thereof which I now consider to represent the best embodiment thereof, but I desire to have it understood that the structure shown is only illustrative and that the invention can be carried out by other means and applied to uses other than those above set forth, within the scope of the following claim.

I claim:

A collet for holding a work piece in a support having a cylindrical chuck opening, an immovable key on the inner wall of said opening and a plunger reciprocable laterally to the axis of said opening, said collet comprising a cylindrical body substantially corresponding with and freely insertable longitudinally in said chuck opening having a longitudinal socket therein and being bifurcated on one side longitudinally from end to end to provide arcuate arms the end of which are normally separated and at least one of which is resilient and adapted to be contracted by the reciprocable movement of said plunger, and said body having a longitudinal slot in the outer surface of at least one of said arms to receive and provide fixed engagement with said key when the collet is inserted in said chuck opening, to maintain said body with its contractible arm coactively juxtaposed to said reciprocable plunger.

JOHN T. OBECNY.

REFERENCES CITED

The following references are of record in the file of this patent:

UNITED STATES PATENTS

| Number | Name | Date |
|---|---|---|
| 1,675,030 | Johnson | June 26, 1928 |
| 1,895,281 | Currie | Jan. 24, 1933 |
| 1,260,130 | Bemis | Mar. 19, 1918 |
| 1,507,381 | Jannell | Sept. 2, 1924 |
| 1,057,605 | Windsor et al. | Apr. 1, 1913 |
| 2,139,735 | Derrig | Dec. 13, 1938 |
| 735,138 | Normand | Aug. 4, 1903 |
| 790,479 | Carr et al. | May 23, 1905 |
| 1,361,198 | Strand | Dec. 7, 1920 |
| 2,162,856 | Nitsch | June 20, 1939 |
| 2,339,799 | Obecny | Jan. 25, 1944 |
| 2,339,800 | Obecny | Jan. 25, 1944 |
| 2,228,337 | Balas | Jan. 14, 1941 |
| 318,986 | Hicks | June 2, 1885 |
| 696,745 | O'Brien | Apr. 1, 1902 |
| 1,189,926 | Ellis | July 4, 1916 |
| 2,177,979 | Davis | Oct. 31, 1939 |
| 2,211,344 | Montgomery | Aug. 13, 1940 |